United States Patent
Beer et al.

(10) Patent No.: US 6,954,882 B2
(45) Date of Patent: Oct. 11, 2005

(54) METHOD AND APPARATUS FOR FAULT LOCATION IN A LOOP NETWORK

(75) Inventors: Reginald Beer, Chandlers Ford (GB); Paul Nicholas Cashman, Alton (GB); Paul Hooton, Eastleigh (GB); Ian David Judd, Winchester (GB); Robert Frank Maddock, Christchurch (GB); Neil Morris, Southsea (GB); Robert Bruce Nicholson, Portsmouth (GB); Barry Douglas Whyte, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 10/172,852

(22) Filed: Jun. 14, 2002

(65) Prior Publication Data

US 2003/0056153 A1 Mar. 20, 2003

(30) Foreign Application Priority Data

Jun. 15, 2001 (GB) .............................. 0114614

(51) Int. Cl.⁷ ................................................ G06F 11/00
(52) U.S. Cl. ........................................ 714/43; 709/224
(58) Field of Search ........................ 714/43, 48, 56, 714/27, 37, 47; 709/224, 223, 229, 250, 251

(56) References Cited

U.S. PATENT DOCUMENTS

| | | | | |
|---|---|---|---|---|
| 4,567,595 A | * | 1/1986 | Hedlund | 714/800 |
| 4,742,518 A | * | 5/1988 | Shedd | 714/704 |
| 5,390,188 A | * | 2/1995 | Dawson | 714/717 |
| 5,924,122 A | * | 7/1999 | Cardoza et al. | 711/150 |
| 6,098,179 A | * | 8/2000 | Harter, Jr. | 714/4 |
| 6,360,335 B1 | * | 3/2002 | Dawson | 714/39 |

FOREIGN PATENT DOCUMENTS

GB   1 111871 A2 *   6/2001   ........... H04L/29/06

* cited by examiner

Primary Examiner—Nadeem Iqbal
(74) Attorney, Agent, or Firm—Jay H. Anderson

(57) ABSTRACT

A method and apparatus are provided for fault location in a loop network (100, 200, 400). The network system having a host port (214) for supplying and receiving data and a plurality of successively connected ports (201, 202, 203, 204, 205) through which data from the host port (214) is transferred. A counter (122) for each port records data transfers in which the amount of data received at a destination port is less than an expected amount of data. When a transfer with less than the expected amount of data is identified for a data flow between a sending port (201) and a destination port (214), the counters are incremented for each port (202, 203, 204, 205, 214) after the sending port up to and including the destination port. Analysing means determines a fault location in the network system from the distribution of counts in the counters (122).

15 Claims, 11 Drawing Sheets

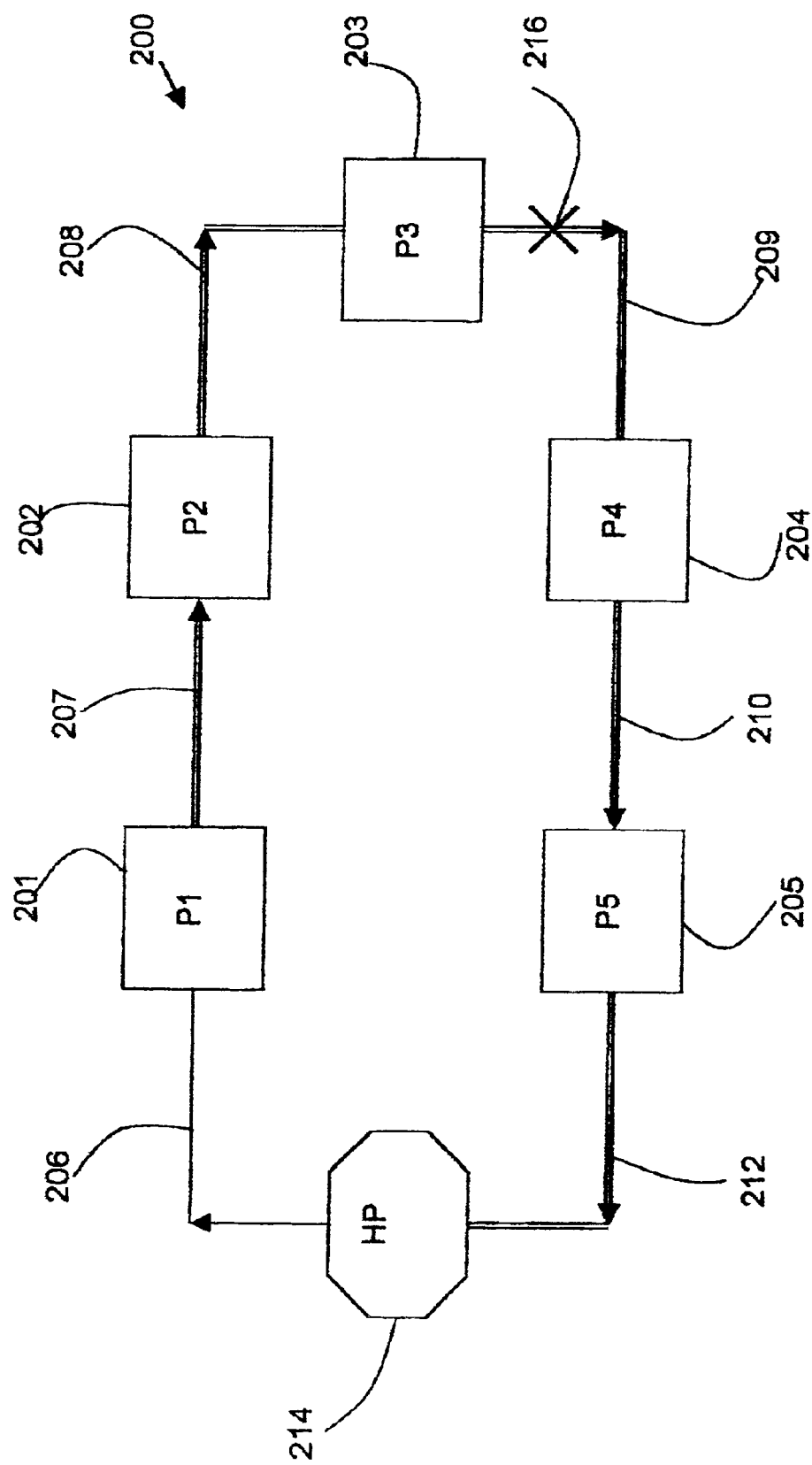

METHOD AND APPARATUS FOR FAULT LOCATION IN A LOOP NETWORK

FIELD OF THE INVENTION

This invention relates to a method and apparatus for fault location in a loop network. In particular, the invention relates to determining the location of a fault in Fibre Channel Arbitrated Loops. The invention could equally apply to determining the location of a fault in other unidirectional loops, for example, Token Ring networks, FDDI (Fibre Data Distributed Interfaces), etc.

BACKGROUND OF THE INVENTION

Fibre Channel Arbitrated Loop (FC-AL) architecture is a member of the Fibre Channel family of ANSI standard protocols. FC-AL is typically used for connecting together computer peripherals, in particular disk drives. The FC-AL architecture is described in NCITS working draft proposals, American National Standard for Information Technology "Fibre Channel Arbitrated Loop (FC-AL-2) Revision 7.0", Apr. 1, 1999 and "Fibre Channel Arbitrated Loop (FC-AL-3) Version 1.0", 20 Sep. 1999.

Electronic data systems can be interconnected using network communication systems. Area-wide networks and channels are two technologies that have been developed for computer network architectures. Area-wide networks (e.g. LANs and WANs) offer flexibility and relatively large distance capabilities. Channels, such as the Small Computer System Interface (SCSI), have been developed for high performance and reliability. Channels typically use dedicated short-distance connections between computers or between computers and peripherals.

Fibre Channel technology has been developed from optical point-to-point communication of two systems or a system and a subsystem. It has evolved to include electronic (non-optical) implementations and has the ability to connect many devices, including disk drives, in a relatively low-cost manner. This addition to the Fibre Channel specifications is called Fibre Channel Arbitrated Loop (FC-AL).

Fibre Channel technology consists of an integrated set of standards that defines new protocols for flexible information transfer using several interconnection topologies. Fibre Channel technology can be used to connect large amounts of disk storage to a server or cluster of servers. Compared to Small Computer Systems Interface (SCSI), Fibre Channel technology supports greater performance, scalability, availability, and distance for attaching storage systems to network servers.

Fibre Channel Arbitrated Loop (FC-AL) is a loop architecture as opposed to a bus architecture like SCSI. FC-AL is a serial interface, where data and control signals pass along a single path rather than moving in parallel across multiple conductors as is the case with SCSI. Serial interfaces have many advantages including: increased reliability due to point-to-point use in communications; dual-porting capability, so data can be transferred over two independent data paths, enhancing speed and reliability; and simplified cabling and increased connectivity which are important in multi-drive environments. As a direct disk attachment interface, FC-AL has greatly enhanced I/O performance.

The FC-AL interface is sufficiently robust to permit devices to be removed from the loop without interrupting throughput and sacrificing data integrity. If a drive fails, port bypass circuits can quickly route around the problem so all drives on the loop remain accessible.

A typical FC-AL may have one or two host bus adapters (HBA) and a set of six or so disk drive enclosures or drawers, each of which may contain a set of ten to sixteen disk drives. There is a physical cable connection between each enclosure and the HBA in the FC-AL. Also, there is a connection internal to the enclosure or drawer, between the cable connector and each disk drive in the enclosure or drawer, as well as other components within the enclosure or drawer, e.g. SES node (SCSI Enclosure Services node).

In practice, all of these connections are subject to deterioration, which in turn causes a gradual degradation of the FC-AL loop. The sort of problems include, but are not limited to: long-term parametric drift of laser-diodes in optical devices (GBICs); faulty copper connections due to series resistance, excess parallel capacitance, broken wire, random noise; faulty optical connections due to laser-diode with reduced output, broken fibre; other phenomena, corrupted data frame, corrupted control frame, corrupted status frame, corrupted primitives, etc.

The solution to the problem of a deteriorated or faulty component is to replace the component. However, this introduces a new problem: which component to be replaced.

There are simplistic approaches to this problem, e.g. replace all cable connections and see if the error rates have improved sufficiently, but such approaches can be very costly, especially if optical cables are involved, and also may not solve the problem.

The operation of FC-AL involves a number of ports connected such that each port's transmitter is connected to the next port's receiver, and so on, forming a loop. Each port's receiver has an elasticity buffer that captures the incoming FC-AL frame or words and is then used to regenerate the FC-AL word as it is re-transmitted. This buffer exists to deal with slight clocking errors that occur. Each port receives a word, and then transmits that word to the next port, unless the port itself is the destination of that word, in which case it is consumed. The nature of FC-AL is therefore such that each intermediate port between the originating port and the destination port gets to 'see' each word as it passes around the FC-AL loop. HBAs such as RAID controllers are attached to loops via ports and may have more than one port, these are referred to as host ports. Disk drive enclosures or drawers are attached to the loop via ports and may have a plurality of ports.

FC-AL architecture may be in the form of a single loop. Often two independent loops are used to connect the same components in the form of dual loops. The aim of these loops is that a single fault should not cause both loops to fail simultaneously. However, some faults, for example in a protocol chip or microprocessor in a disk drive, can cause both loops to fail. More than two loops can also be used.

Data is passed around a FC-AL in units of frames. Frames are made up of words where one word is 4 bytes. A byte in Fibre Channel architecture is logically 10 bits.

FC-AL defines an Extended Link Service (ELS) command that can return a set of optionally implemented counters. These counters detail the number and type of errors detected by that port. They are referred to as the Link Error Status Block (LESB). This is very useful data, and this can be used to determine the 'area' of the actual error, or even multiple errors. The customer can then be given specific information as to which cables or enclosures require replacing Unfortunately, although support for the ELS LESB is required, implementation of the counters is not required. That is to say, that every port must respond to a request for ELS LESB data, but the data returned in the LESB counters need not be valid. As the ELS LESB counter is optional it cannot be relied upon to locate loop faults. It is therefore possible that vital error detection information is not available.

FC-AL requires ports that receive an invalid or corrupt word (known as an Invalid Transmission Word), to replace that word with a Current Fill Word (CFW). By replacing the corrupt word with this valid word (the CFW), no other port will see the corrupt word. The port replacing the corrupt word may optionally increment a LESB counter called the Invalid Transmission Word Count (ITWC). If it does so, then it will be relatively simple for a host bus adapter (HBA) to detect where errors are occurring by looking at each port's ITWC.

The teaching of this disclosure does not relate to using the ITWC to detect the area of the error, as this is the whole purpose of the counter. However, if a port does not increment the ITWC, then locating the fault becomes more difficult.

There is another counter returned in the LESB, called the Invalid CRC (Cyclic Redundancy Check) Count. Several bytes of cyclic redundancy check (CRC) information are transmitted along with each packet of user data. The receiving device then uses the CRC information to check data received and to request a resend if an error is detected.

When a frame of data is sent by a source port such as an HBA, intermediate ports between the host port and the destination port check the number of bits and if there is an error, substitute a CFW in the frame. The destination port checks the CRC count to confirm if the frame is correct. If the frame contains a CFW the CRC count will fail and the receiving port discards the frame.

The invalid CRC count is incremented by any port whenever an invalid CRC is detected. This indicates that there has been some corruption of an inbound data frame, even ones that do not generate Invalid Transmission Words. However, ports do not check a data frame's CRC when the data frame is not destined for that port. This means that to determine the source of errors in this case, averaging of CRC error paths is required. This will then highlight the area where errors are occurring and over time, and with random distribution of connections and data frames, then the source of the error can be more accurately determined.

As the frame containing the CFW is discarded, the destination port will receive less valid bytes than it expected to. This is a "data under run". The destination port checks the CRC count at a low level operation and counts bytes received and determines if they are less than they should be in an address register at a higher level operation. For example, a sequence number in each frame will detect if a frame is missing.

The aim of this invention is to be able to locate the faulty component or connection, so that it can be replaced and maximum bandwidth achieved and maintained.

In FC-AL architectures, the ITWC may be implemented by all the ports and this provides a determination of fault location. However, drives do not need to implement any of the counters of the LESB. In the case where some or all of the ports do not implement the ITWC, then further analysis is required as provided by the present invention. Similarly, it is an aim of the invention to provide a means of fault determination in other unidirectional loop architectures.

SUMMARY OF THE INVENTION

According to a first aspect of the present invention there is provided a method for fault location in a loop network including a plurality of ports, the method comprising: identifying a data transfer between two ports in which the data received at a destination port is less then the expected amount of data; incrementing a count for each port after a sending port for the data transfer up to and including the destination port for each identified data transfer; analysing the counts to determine a fault location.

Preferably, the step of analysing the counts includes obtaining details of the topology of the loop network. The step of analysing the counts, preferably includes ordering the counts in an order according to the number of ports traversed in the loop network.

The data transfers may be read transfers and the step of analysing the counts may identify a port location in the ordered counts at which the total counts for each port stop incrementing.

The data transfers may be write transfers and the step of analysing the counts may identify a port location in the ordered counts at which the total counts for each port drops.

The data transfers to each port may be counted and the step of analysing may include solving simultaneous equations for each port to determine the error rates for each port.

The method may include sending and receiving data from a host port to a plurality of successively connected ports. Preferably, the loop network is a Fibre Channel Arbitrated Loop. Two fault locations may be determined in a single analysis by analysing both read and write flows.

According to a second aspect of the present invention there is provided a loop network system comprising: a host port for supplying and receiving data; a plurality of successively connected ports through which data from the host port is transferred; a counter for each port for recording data transfers in which the amount of data received at a destination port is less than an expected amount of data, wherein, when a data transfer in which the amount of data transferred is less than an expected amount of data is identified for a data transfer between a sending port and a destination port, the counters are incremented for each port after the sending port up to and including the destination port, analysing means for determining a fault location in the network system from the distribution of counts in the counters.

Preferably, the analysing means includes means for obtaining details of the topology of the network. The analysing means may include means for ordering the counts for the ports in an order according to the number of ports traversed in the loop network system.

The data transfers may be read transfers and the analysing means may identify a port location at which the total counts for each port stop incrementing.

The data transfers may be write transfers and the analysing means may identify a port location at which the total counts for each port drops.

Preferably, the loop network system is a Fibre Channel Arbitrated Loop.

According to a third aspect of the present invention there is provided a computer program product for fault location in a loop network including a plurality of ports, the computer program product stored on a computer readable storage medium, comprising computer readable program code means for performing the steps of: identifying a data transfer between two ports in which the data received at a destination port is less then the expected amount of data: incrementing a count for each port after a sending port for the data transfer up to and including the destination port for each identified data transfer; analysing the counts to determine a fault location.

Ports receiving frames of data, detect errors in the data by data under runs. If the host port increments a counter for each port between the sending and receiving in ports every time a data under run occurs, a general map of the error path-will emerge. This is because transfers from the sending port to a port before the error injecting component will not cause data under run errors and hence no counts. Transfer to ports after the error will cause data under run errors whenever the error manifests itself. The host port still requires knowledge of the topology of the loop to be able to do this. The topology is most readily obtained from a loop initialisation procedure, although other means of obtaining the topology could be used.

The advantage of this method and apparatus is that no support for any of the counters in the LESB is required to locate a fault in a network loop.

BRIEF DESCRIPTION OF THE DRAWINGS

Embodiments of the invention are now described, by means of example only, with reference to the accompanying drawings in which:

FIG. 2c is a block diagram showing a data read in the Fibre Channel Arbitrated Loop of FIG. 2b;

DESCRIPTION OF THE PREFERRED EMBODIMENTS

Figure 1:
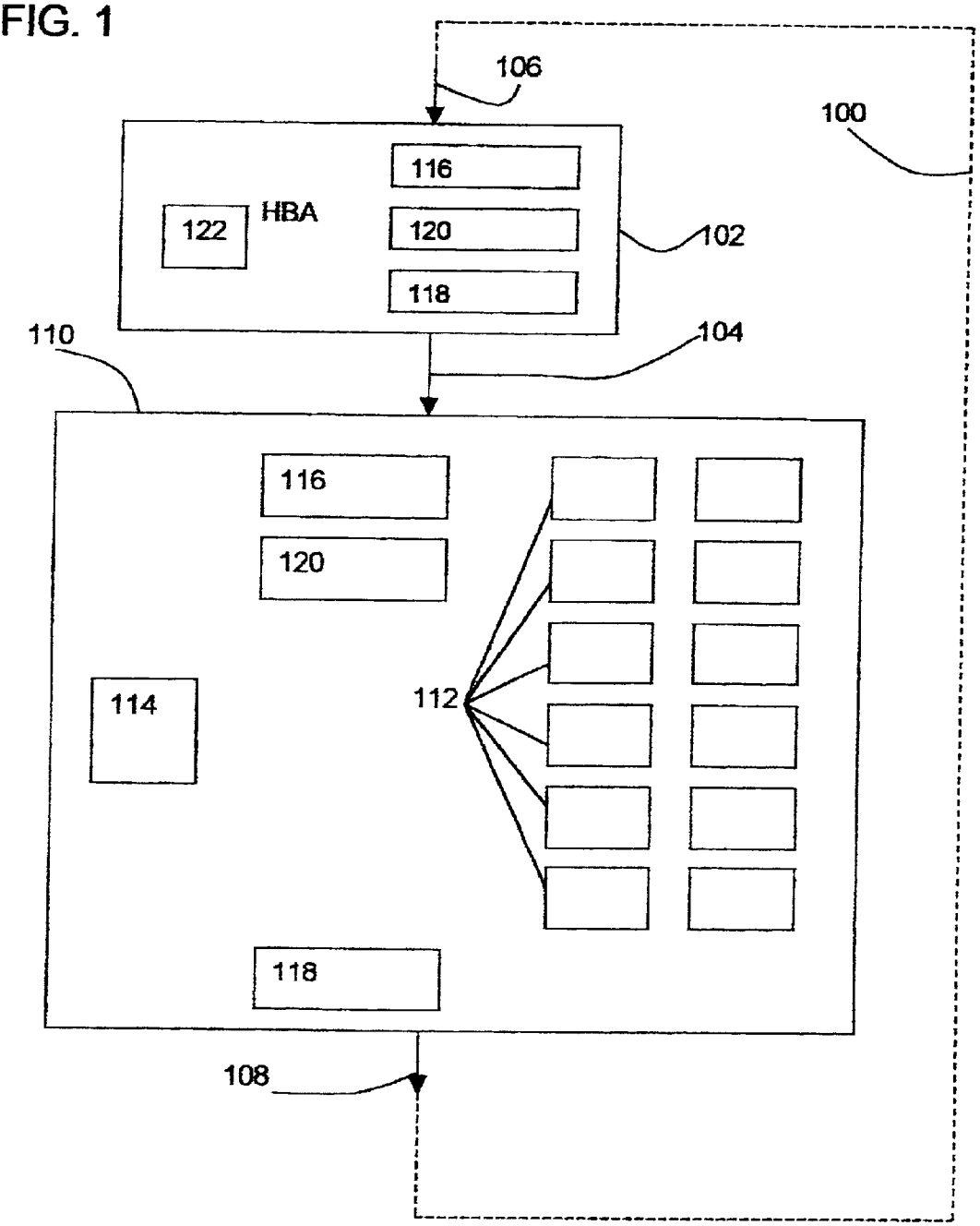
FIG. 1 is a block diagram of a Fibre Channel Arbitrated Loop in accordance with the present invention.

Referring to the drawings, a network system with a plurality of serially connected ports in the form of a Fibre Channel Arbitrated Loop (FC-AL) is provided for connecting together computer peripherals, in particular disk drives. This described embodiment is given in the context of FC-AL architecture although the described method and apparatus could be applied to any unidirectional loop network.

A single loop is referred to in this description; however, there may be dual loops or any number of loops in the architecture.

FIG. 1 shows part of a FC-AL 100 with ports in the form of a host bus adapter (HBA) 102 and a disk drive enclosure or drawer 110. The FC-AL 100 may have one or more HBAs 102 and a plurality of disk drive enclosures or drawers 110. The drawers 110 and the HBA 102 are connected by physical cable connections 104, 106, 108. In the description, the HBA is referred to as the host port and the disk drive enclosures or drawers are referred to as node ports or simply ports. In FIG. 1 a HBA or host port 102 is shown with a cable connection 104 to a node port 110. A cable connection 108 leads from the node port 110 to the next node port in the loop 100 (not shown). The loop 100 is connected back to the host port 102 by a cable connection 106.

Each node port 110 in the loop 100 contains a set of ten to sixteen disk drives 112 connected serially in the loop which can also be referred to individually as ports. There is a connection-internal to the drawer 110 between the cable connectors 104. 108 and each disk drive 112 as well as the other-components in the enclosure or drawer 110.

Each node port 110 and host port 102 in the loop 100 has a receiver 116 and a transmitter 118. The ports are connected such that each port's transmitter 118 is connected to the next port's receiver 116, and so on, forming the loop 100. Each port's receiver 116 has an elasticity buffer 120 that captures the incoming FC-AL words and is then used to regenerate the FC-AL word as it is re-transmitted.

The host port 102 includes a counter means 122 which includes counters for each of the ports in the loop 100.

Figure 2A:
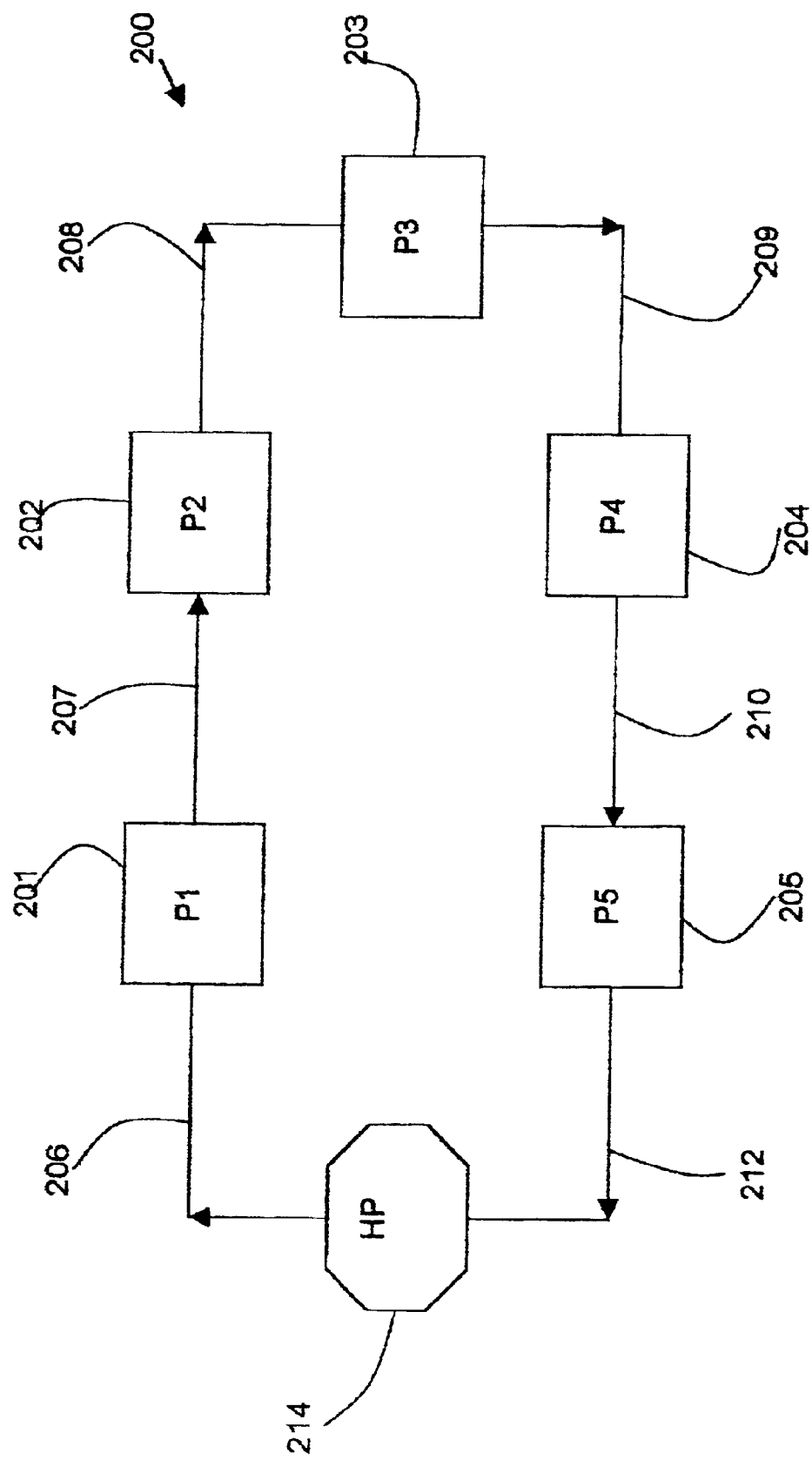
FIG. 2a is a block diagram showing data flow around a Fibre Channel Arbitrated Loop in accordance with the present invention.

FIG. 2a shows a loop 200 with a host port 214 and node ports P1 201, P2 202, P3 203, P4 204 and P5 205 with connections or links 206, 207, 208, 209, 210, 212. It can be seen from the figure that when data is written from the host port 214 to P5 205, the data actually flows around the whole of the loop 200 of the FC-AL. The data is transmitted by the host port 214 via connection 206 and received by P1 201, P1 201 then transmits the data via connection 207 which is received by P2 202 which then transmits the data, and so on until P5 205 receives the data.

Figure 2B:
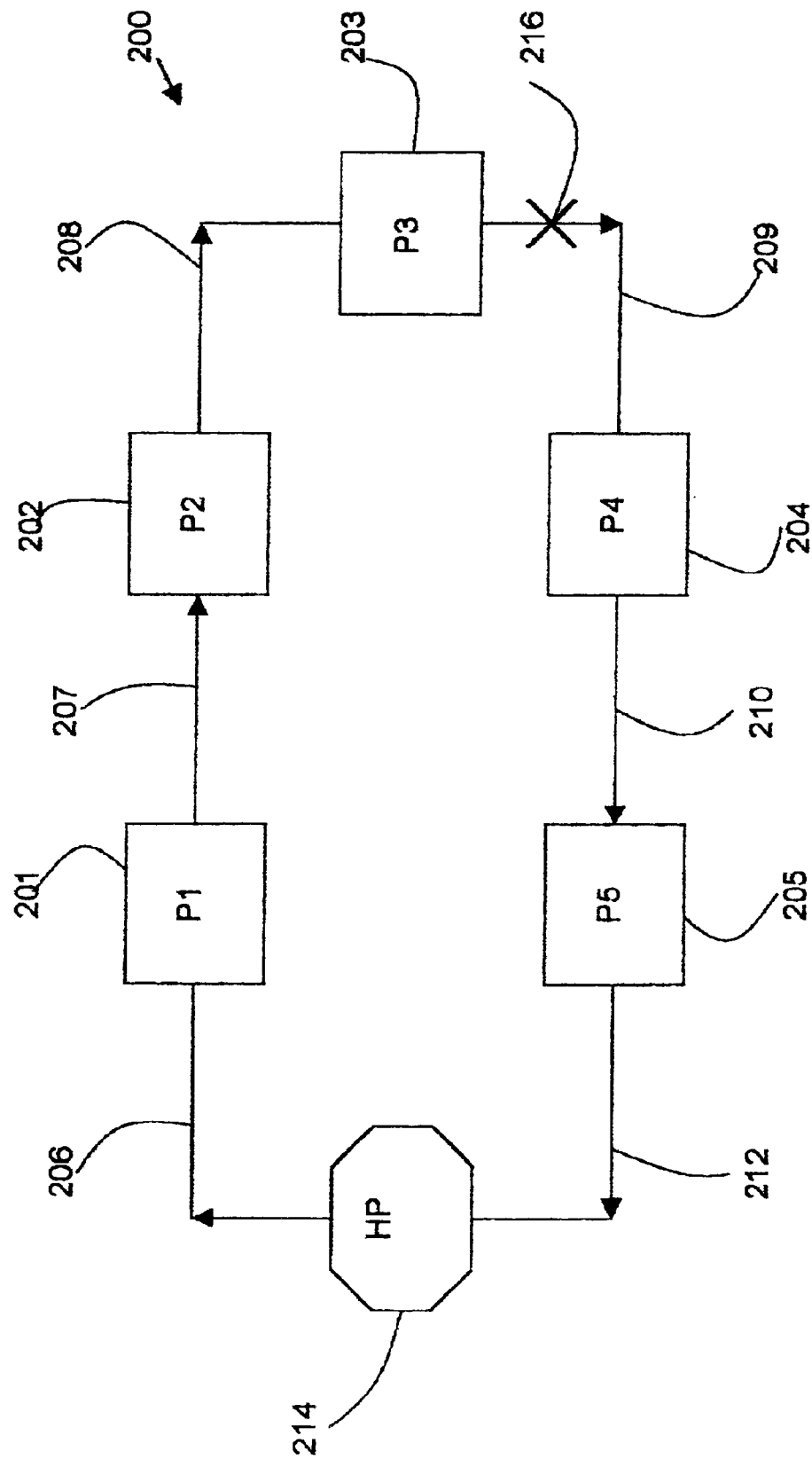
FIG. 2b is a block diagram showing the data flow around the Fibre Channel Arbitrated Loop of FIG. 2a including a faulty connection.

FIG. 2b shows a loop 200 with a fault 216 in connection 209 between ports P3 203 and P4 204. For the purposes of the following discussion, it is assumed that the connection 209 is faulty and occasionally generates Invalid Transmission Words.

When the host port 214 is reading data from port P2 202, data is transmitted from P2 202 to P3 203, then to P4 204, then, to P5 205 and finally to the host port 214. If during this transfer of data, the fault 216 in connection 209 between ports P3 203 and P4 204 occasionally corrupts a word, then P4 204 will see this and replace the word with the Current Fill Word (CFW). P5 205 detects no error from P4 204 due to the CFW. The host port 214, however, will usually see an invalid Cyclic Redundancy Clock (CRC), because a data word was changed into the CFW. The consequence of this is that the data frame as a whole is invalid and all the data contained in the data frame is discarded. The host port 214 will detect that the transfer completes and was missing some data. This is called 'data under run'. If there has been a data under run error, insufficient data has been transferred by the exchange and an error must have occurred. The port receiving the frame can detect errors in this way.

A data under run for a data read is where the amount of data that was actually transferred is less than that that was expected from the transfer. There are also situations where the amount of data requested by the initiator of a transaction is not all available, and less data is transferred than was requested. In this situation, the responder to the transaction indicates the amount of data that was not sent as well as sending the data that was available. In the a case, the initiator will know how much data it received and how much data the responder did not give. Normally, this will add up to the amount of data requested by the initiator and this is not a data under run. If the amount of data transferred and the amount of data not sent do not add up to the amount of data requested, this would be a data under run. The following table gives an example of data transferred with an indication of whether there has been a data under run or not.

| Amount of data requested | Amount of data transferred | Amount of data not sent | Data under run? |
|---|---|---|---|
| 2048 | 2048 | 0 | NO |
| 2048 | 1024 | 0 | YES |
| 2048 | 1024 | 1024 | NO |
| 2048 | 1024 | 512 | YES |

A data under run for a data write is where the responder detects that insufficient data has been received from the initiator. The initiator knows how much data is to be transferred before initiating the transfer and the responder will expect to receive this amount. The responder uses a response frame to indicate that insufficient data was received and indicates the amount of data not received.

For the purposes of the described embodiments, it is a requirement that the host port 214 in a loop 200 can detect data under run errors so that the counters 122 can be used for data reads, and the devices 112 can detect and report data under runs to the host port 214 so that counters 122 can be used for data writes.

The FC-AL 200 defines a Loop Initialisation Procedure. A Loop Initialisation Procedure is a logical procedure used by a port to determine its environment and to validate an Arbitrated Loop Physical Address (AL_PA) of a port. When the port detects that it is no longer receiving valid data across the connection, it begins to generate loop initialisation primitive ordered sets. The ordered sets are recognised by the ports as loop initialisation procedure sequences. The ordered sets propagate around the loop 200. Each port receiving an ordered set, stops generating data or other signals and sends an ordered set of signals.

Optional features of the loop initialisation procedure sequence are the Loop Initialisation Report Position (LIRP) frames and the Loop Initialisation Loop Position (LILP) frames. LIRP frames report positions of ports and are used to collect the relative positions of all participating ports on a loop. LILP is used to inform all ports of the relative positions of all participating ports on the loop from the perspective of a Loop Initialisation Master (LIM).

It is a requirement of the described embodiments that a means is provided for determining the addresses and locations of the ports. This can be done by the LILP frame being made available to the host port. The LILP frame contains a list of each port's address in order as seen from the Loop Initialisation Master (LIM). The host port 214 uses this information to precisely determine the physical topology of the loop 200 of the FC-AL.

Other ways of determining the addresses and locations of the ports in a loop could equally be used.

In the first set of embodiments described herein, it is assumed that there is an even distribution of reads between the host port 214 and each of the node ports P1 201, P2 202, P3 203, P4 204 and P5 205. The data will therefore flow from the relevant port to the host port 214, as indicated by the arrows in FIG. 2b. It is assumed that the link 209 between P3 203 and P4 204 is faulty 216 and generates errors occasionally and evenly, that is, it is not biased to data reads from a particular port.

Every time the host port 214 detects a data under run error, as previously described, the host port 214 increments counters 122 associated with each port after the originating port and including the receiving port (itself). As there is an even distribution of reads and the error frequency is also regular over that period, it is possible for the host port 214 to analyse the counters 122 and to determine the source of the error.

As an example, reference is made to FIG. 2c. FIG. 2c illustrates a data read by the host port 214 of P1 201. The data flows from P1 201 through connection 207 to P2 202, through connection 208 to P3 203. The data then tries to flow from P3 203 to P4 204 via connection 209. The connection 209 between P3 203 and P4 204 generates errors 216 occasionally and evenly (no more errors are generated for reads from a particular port than for another port). P4 204 does not receive a valid read word and therefore replaces the word with a CFW. The data then flows from P4 204 via connection 210 to P5 205 and through connection 212 to the host port 214. The flow of data for the read from P1 is shown as a double line in FIG. 2c.

The host port 214 detects a data under run error when it receives the read from P1 201. The host port 214 increments a counter 122 for each port after the originating port P1 201 and including the receiving host port 214, namely it increments counters for P2 202, P3 203, P4 204, P5 205 and the host port (HP) 214.

When reading from P1 201 as shown in FIG. 2c, the counters 122 record the following increments:

| P1 | not counted, as it is the originating port |
|---|---|
| P2 | 1 |
| P3 | 1 |
| P4 | 1 |
| P5 | 1 |
| HP | 1 |

If there is an even distribution of reads from each of the ports P1 201, P2 202, P3 203, P4 204 and P5 205, the counts will build up a picture of the loop 200. When reading from P2 202, the counter 122 will record the following:

| P1 | not counted, as a read from P2 does not pass through P1 |
|---|---|
| P2 | not counted, as P2 is the originating port |
| P3 | 1 |
| P4 | 1 |
| P5 | 1 |
| HP | 1 |

When reading from P3 203, the counter 122 will record the following:

| P1 | not counted, as a read from P3 does not pass through P1 |
|---|---|
| P2 | not counted, as a read from P3 does not pass through P2 |
| P3 | not counted, as P3 is the originating port |

-continued

| | | |
|---|---|---|
| P4 | 1 | |
| P5 | 1 | |
| HP | 1 | |

Figure 2D:
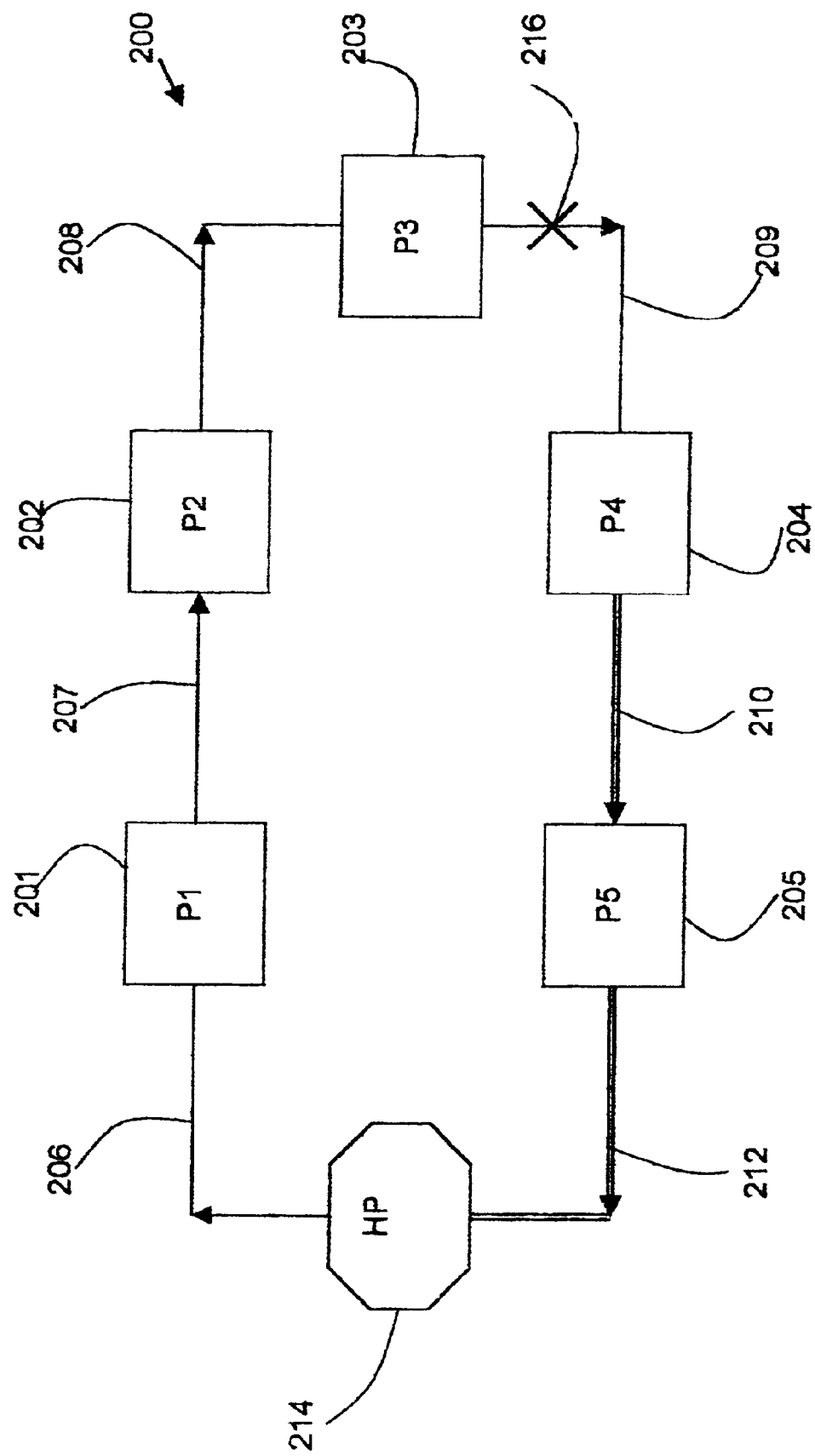
FIG. 2d is a block diagram showing a data read in the Fibre Channel Arbitrated Loop of FIG. 2b.

FIG. 2d shows a data read to the host port 214 from port P4 204. A read from P4 204 is transmitted via connection 210 to P5 205 and via connection 212 from P5 205 to the host port 214. The flow of data from a read from P4 204 is shown as a double line in FIG. 2d. The host port 214 does not detect a data under run as the read is complete and therefore the counter 122 is not incremented. The read from P4 204 does not pass through the faulty connection 216 and therefore the data read is not invalid. Similarly, a data read from Port P5 205 does not pass through the faulty connection 216 and no count is recorded for a read from P5 205.

The counters 122 will relate to the ports P1 201, P2 202, P3 203, P4 204, P5 205 by a port name which can be the World Wide Port Name (WWPN) which is an address given to each port during the manufacturing process and this address stays the same during the life of the node to which the port is related.

The ports do not need to be ordered in the order they are physically located in the loop during counting.

A means for identifying the topology of the loop, for example a Loop Initialisation Procedure, is used to order the port names in the order in which they are physically located in the loop.

If the counts shown above for data reads from P1 201, P2 202, P3 203, P4 204 and P5 205 are added and put in the order in which they physically appear in the loop, a picture or map is developed of the fault location. As it has been assumed that there is an equal distribution of reads from each of the ports, the counter distribution will follow the pattern shown for one read from each port shown in Table 1 below. It is also assumed that there was one error when reading each port which corresponds to an equal occurrence of errors over a longer time period.

TABLE 1

| Port | Count | Totals |
|---|---|---|
| HP | 1 + 1 + 1 | 3 |
| P1 | | 0 |
| P2 | 1 | 1 |
| P3 | 1 + 1 | 2 |
| P4 | 1 + 1 + 1 | 3 |
| P5 | 1 + 1 + 1 | 3 |

Only reads from ports P1, P2 and P3 will generate an error. In each case the originating port is not counted. It can be seen that the point at which the error occurs is the point at which the total count stops incrementing. The actual error is in the link 209 from the transmitter of port P3 203 and the receiver at port P4 204. The actual recovery from this depends on the physical connectivity involved and varies accordingly. The link 209 could be bypassed and then removed for servicing.

Figure 3A:
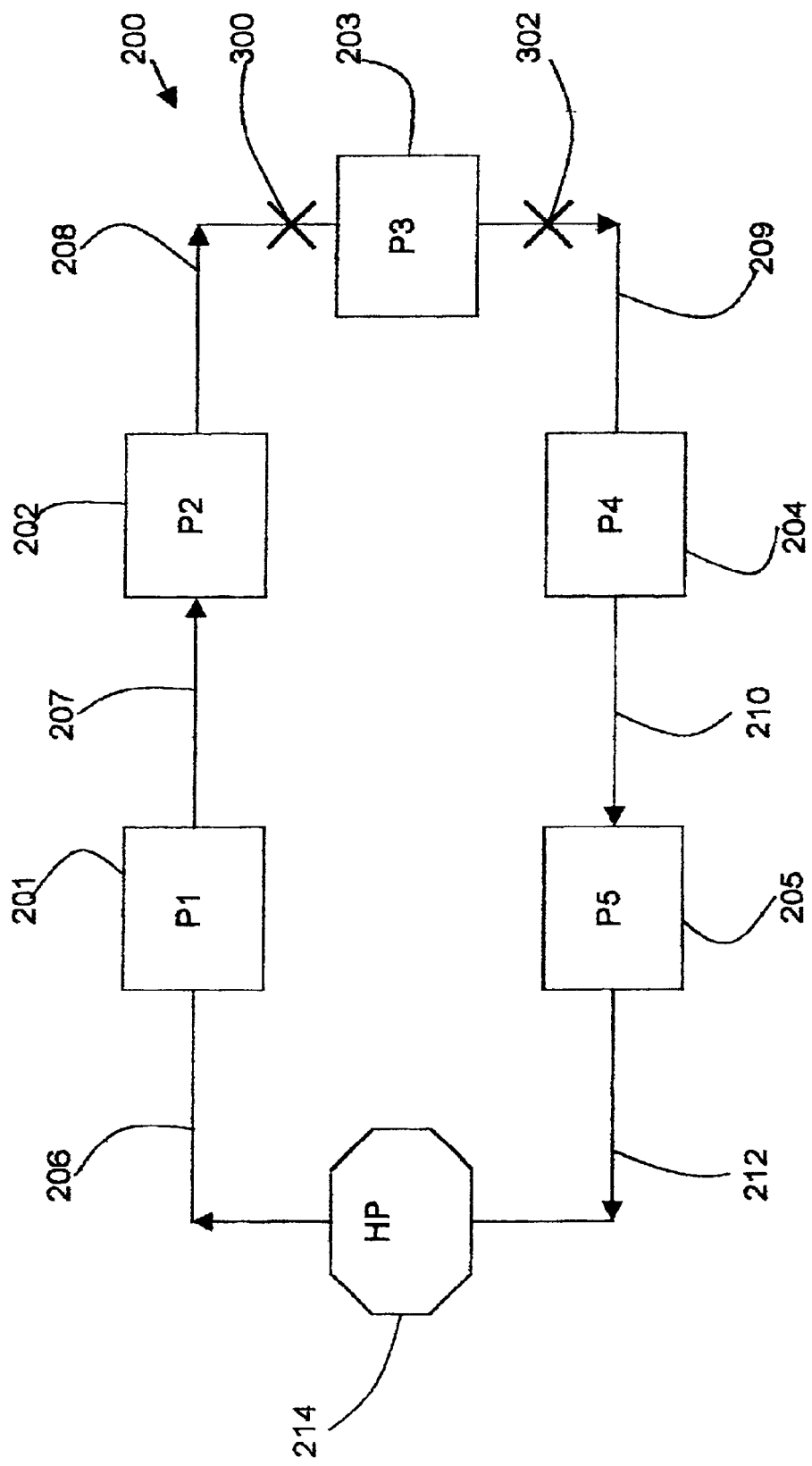
FIG. 3a is a block diagram showing the data flow around the Fibre Channel Arbitrated Loop of FIG. 2a including two faulty connections.

The cases where there are multiple errors are now considered. Firstly, when the errors are in adjacent port links. FIG. 3a shows a loop 200 with two faults which generate errors. The first fault 300 is in the connection 208 between P2 202 and P3 203 and the second fault 302 is in the adjacent connection 209 between P3 203 and P4 204. The counters for the error condition shown in FIG. 3a would be as in Table 2. Again, it is assumed that the ports are read evenly and the errors occur evenly.

TABLE 2

| Port | Count | Totals |
|---|---|---|
| HP | 1 + 1 + 1 | 3 |
| P1 | | 0 |
| P2 | 1 | 1 |
| P3 | 1 + 1 | 2 |
| P4 | 1 + 1 + 1 | 3 |
| P5 | 1 + 1 + 1 | 3 |

Only reads from ports P1 201, P2 202 and P3 203 will generate data under run errors. The analysis shows that there is no difference in counter values between Table 1 and Table 2. Therefore, just using data reads is not sufficient to locate two faulty connections. However, note that this error looks like there is an error between P3 203 and P4 204 in the connection 209 as this is where the total count stops incrementing. This is in fact correct, and the recovery from this would be to bypass the connection 209 and to repair this link thereby reducing the FC-AL loop 200 to having only one error. The single remaining error in connection 208 between P2 202 and P3 203 could then be detected using the same analysis. Therefore, over a longer period of time and assuming that the first error could be isolated or repaired, the second error could be detected.

Figure 3B:
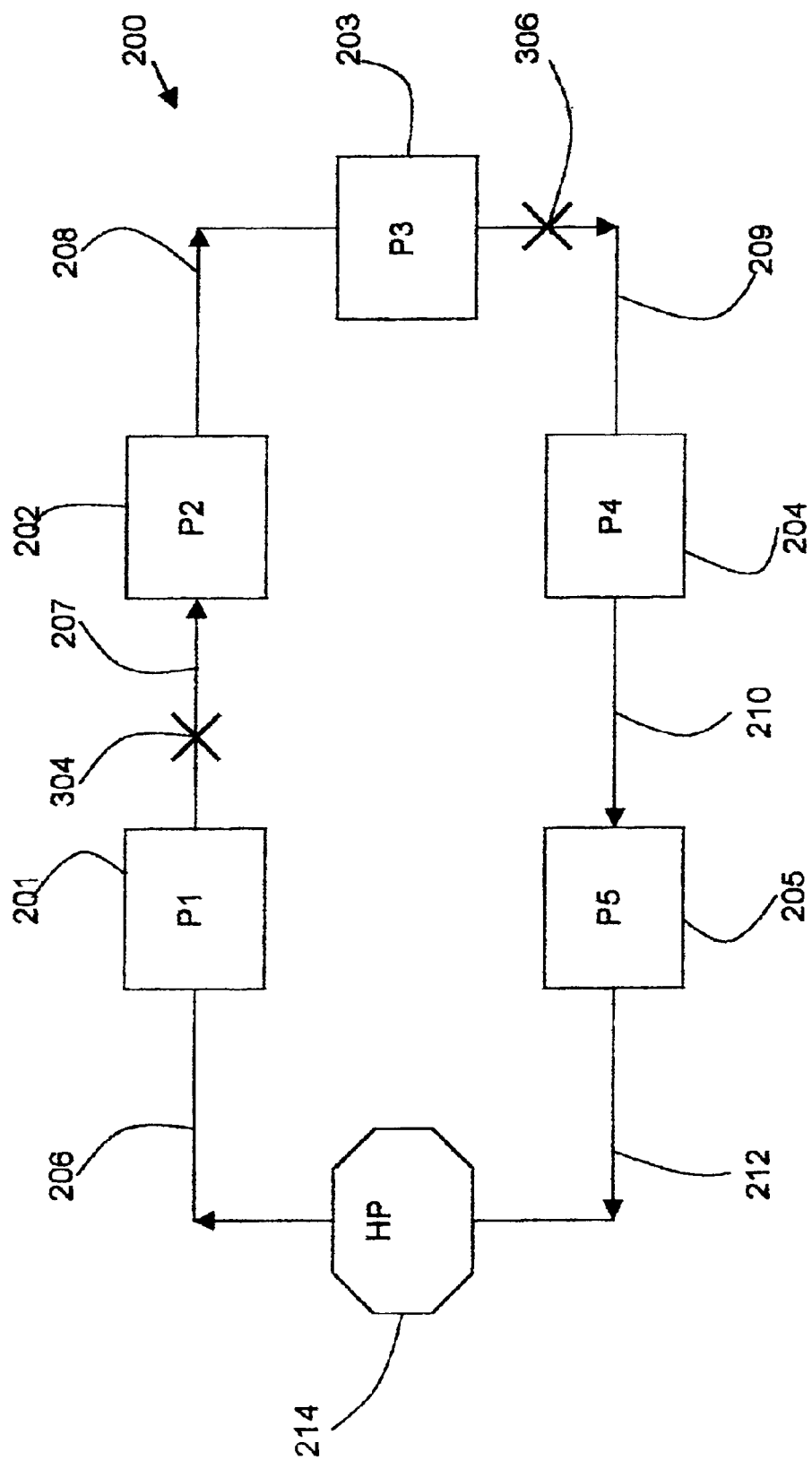
FIG. 3b is a block diagram showing the data flow around the Fibre Channel Arbitrated Loop of FIG. 2a including two faulty connections.

The case where the errors are not adjacent is shown in FIG. 3b. This figure shows two errors 304, 306 in non-adjacent links, namely in connection 207 between P1 201 and P2 202 and in connection 209 between P3 203 and P4 204. The counters for the above error condition would be as given in Table 3.

TABLE 3

| Port | Count | Totals |
|---|---|---|
| HP | 1 + 1 + 1 | 3 |
| P1 | | 0 |
| P2 | 1 | 1 |
| P3 | 1 + 1 | 2 |
| P4 | 1 + 1 + 1 | 3 |
| P5 | 1 + 1 + 1 | 3 |

Only reads from ports P1, P2 and P3 will generate data under run errors. The analysis shows that there is no difference in counter values between Table 2 and Table 3. It is now clear that the data under run for data reads will only determine the faulty link that is the last in the FC-AL loop 200 before the host port 214.

In the second set of embodiments, data writes are considered and analysed. Again, it is assumed that data is written equally to each of the ports P1 201, P2 202, P3 203, P4 204 and P5 205. It is also assumed that errors occur with an even frequency at a faulty connection. In the case of data writes, the data comes from the host port 214 to P1 201, etc.

Figure 4A:
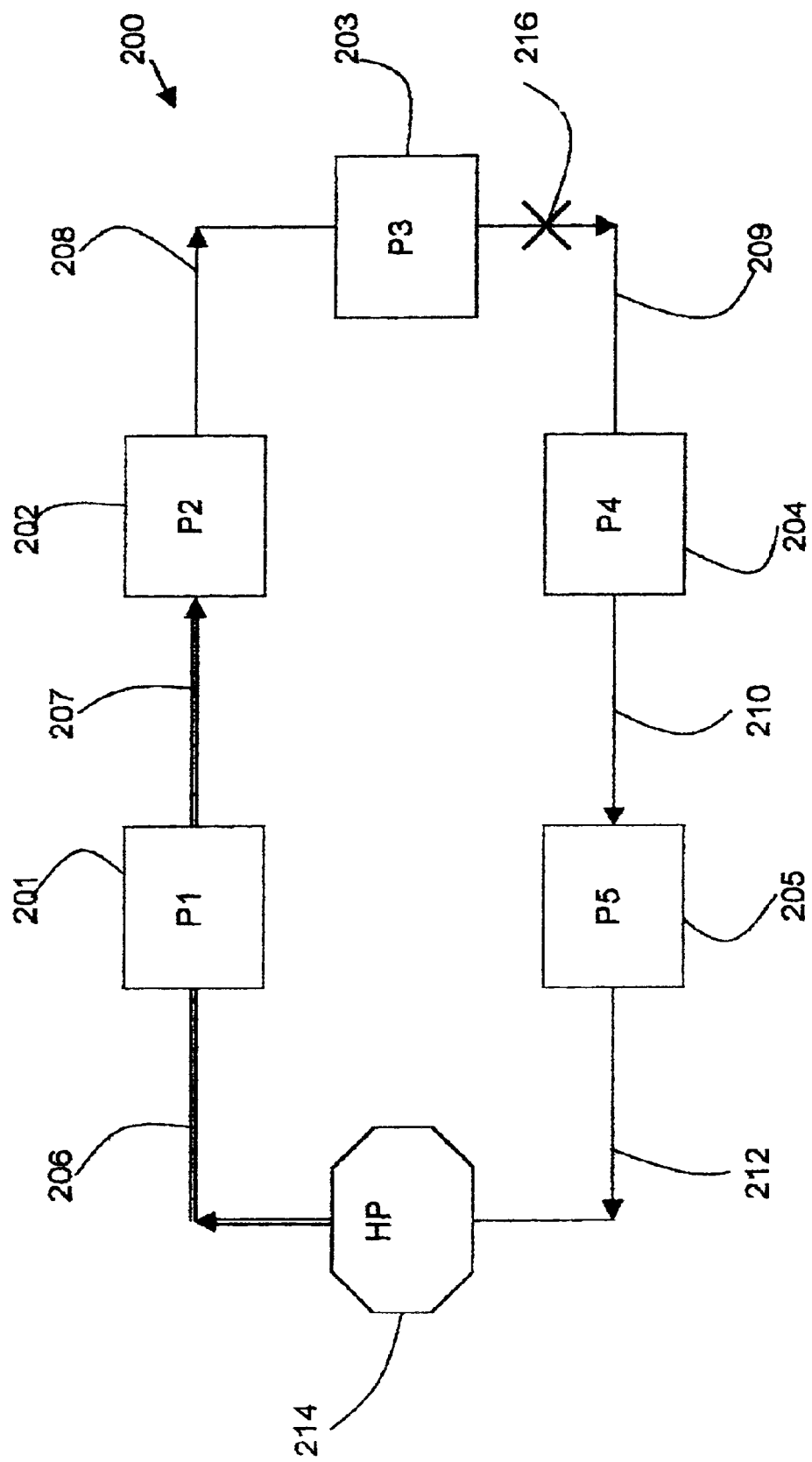
FIG. 4a is a block diagram showing a data write in the Fibre Channel Arbitrated Loop of FIG. 2b.

FIG. 4a shows a data write from the host port 214 to P2 202. The data is transmitted from the host port 214 via connection 206 to P1 201 and from P1 201 via connection 207 to P2 202. If there is a fault 216 at connection 209 between P3 203 and P4 204, this will not affect a data write to P2 202. The path of the flow of data in the data write is shown by a double line in FIG. 4a.

Figure 4B:
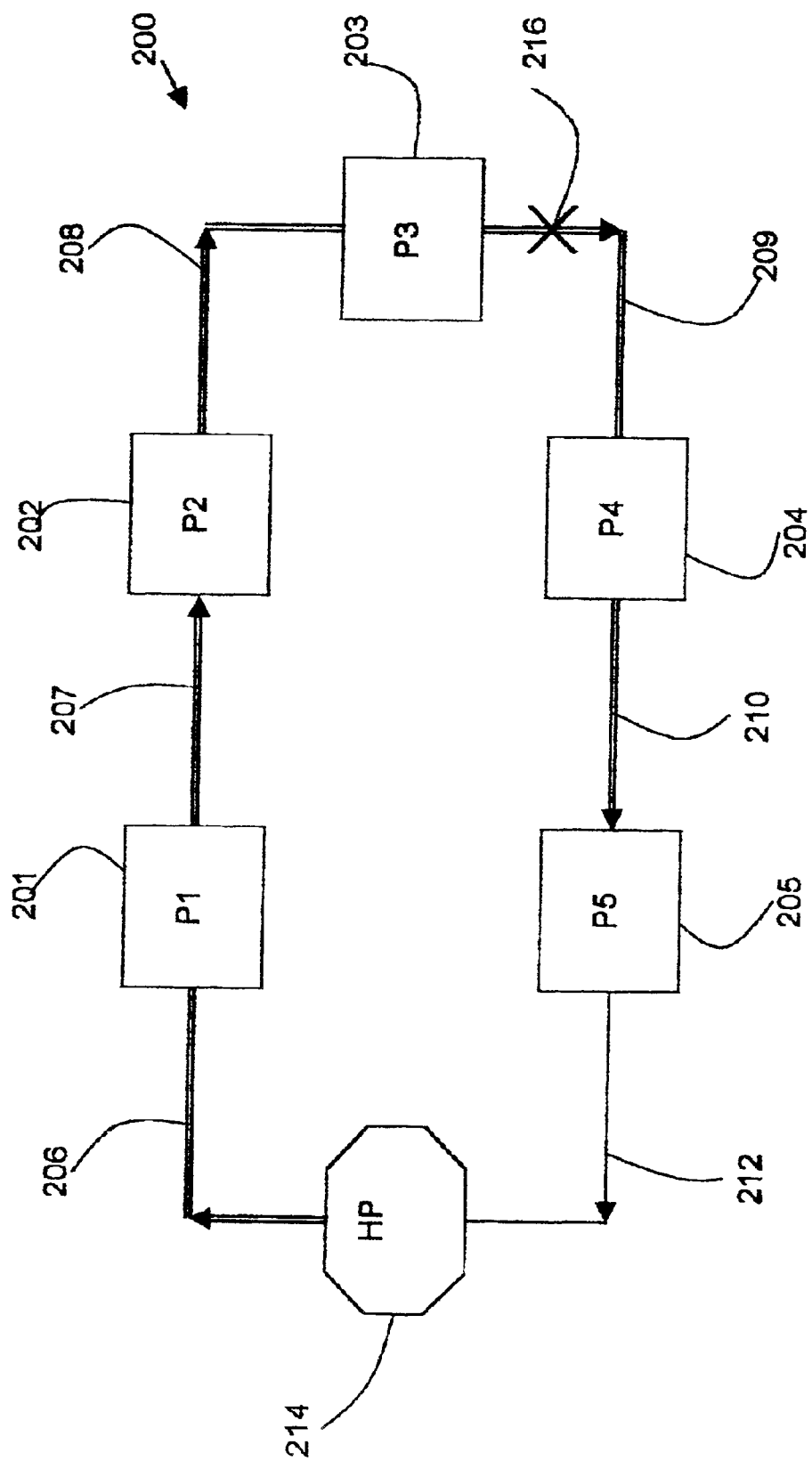
FIG. 4b is a block diagram showing a data write in the Fibre Channel Arbitrated Loop of FIG. 2b.

FIG. 4b shows a data write from the host port 214 to P5 205. The data is transmitted from the host port 214 via connections 206, 207, 208, 209, 210 and ports P1 201, P2

202, P3 203, P4 204, P5 205. The flow of data for a write to P5 is shown by a double line in FIG. 4b. There is a fault 216 in the connection 209 between P3 203 and P4 204. When the data write is transmitted via the faulty connection 209, the data is incompletely received by P4 204 and P4 204 replaces the data word with a CFW. The data is then transmitted from P4 204 via connection 210 to P5 205. The port P5 205 detects a data under run and informs the host port 214 which increments a counter 122 for each port after the originating port and including the receiving port. In this case, the counter is not incremented for the originating port which is the host port 214 but is incremented for the other ports, P1 201, P2 202, P3 203, P4 204 and P5 205.

When writing to P5 205 as shown in FIG. 4b, the counter 122 records the following increments:

| | |
|---|---|
| HP | not counted, as it is the originating port |
| P1 | 1 |
| P2 | 1 |
| P3 | 1 |
| P4 | 1 |
| P5 | 1 |

If there is an even distribution of writes to each of the ports P1 201, P2 202, P3 203, P4 204 and P5 205, the counts will build up a picture of the loop 200. When reading from P4 204, the counter 122 will record the following:

| | |
|---|---|
| HP | not counted, as it is the originating Port |
| P1 | 1 |
| P2 | 1 |
| P3 | 1 |
| P4 | 1 |
| P5 | not counted, as a write to P4 does not pass through P5 |

When writing to P3 203, P2 202 and P1 201 a count is not recorded as the writes do not pass through the faulty connection 209.

The resulting counters, for the error rates for a loop 200 with a faulty connection 209 between ports P3 203 and P4 204 are shown in Table 4.

TABLE 4

| Port | Count | Totals |
|---|---|---|
| HP | | 0 |
| P1 | 1 + 1 | 2 |
| P2 | 1 + 1 | 2 |
| P3 | 1 + 1 | 2 |
| P4 | 1 + 1 | 2 |
| P5 | 1 | 1 |

Only writes to ports P4 and P5 will generate data under run errors. The point at which the total count drops is after the problem, so it can be determined that the error is between P3 and P4.

Following the logic from the data read test cases, the data write cases will find the first faulty link in the FC-AL loop, but not multiple faulty links. Combining data read and data write analysis, it is possible to find two faulty links at once by analysing the counts to locate the points at which the total counts stop incrementing and the point at which the total count drops. Any more than two faults are not possible to locate in the first instance. However, further faults could be located if the previously identified faults were repaired in some way.

This disclosure has assumed that the data reads and writes are distributed evenly. Embodiments with uneven data reads are now considered. Returning to the case of a faulty connection between ports P3 203 and P4 204 shown in FIG. 2b, there are three ways to unbalance the tables. Firstly, more reads from ports P1 and P2; secondly more reads from port P3; thirdly more reads from ports P4 and P5.

Figure 5:
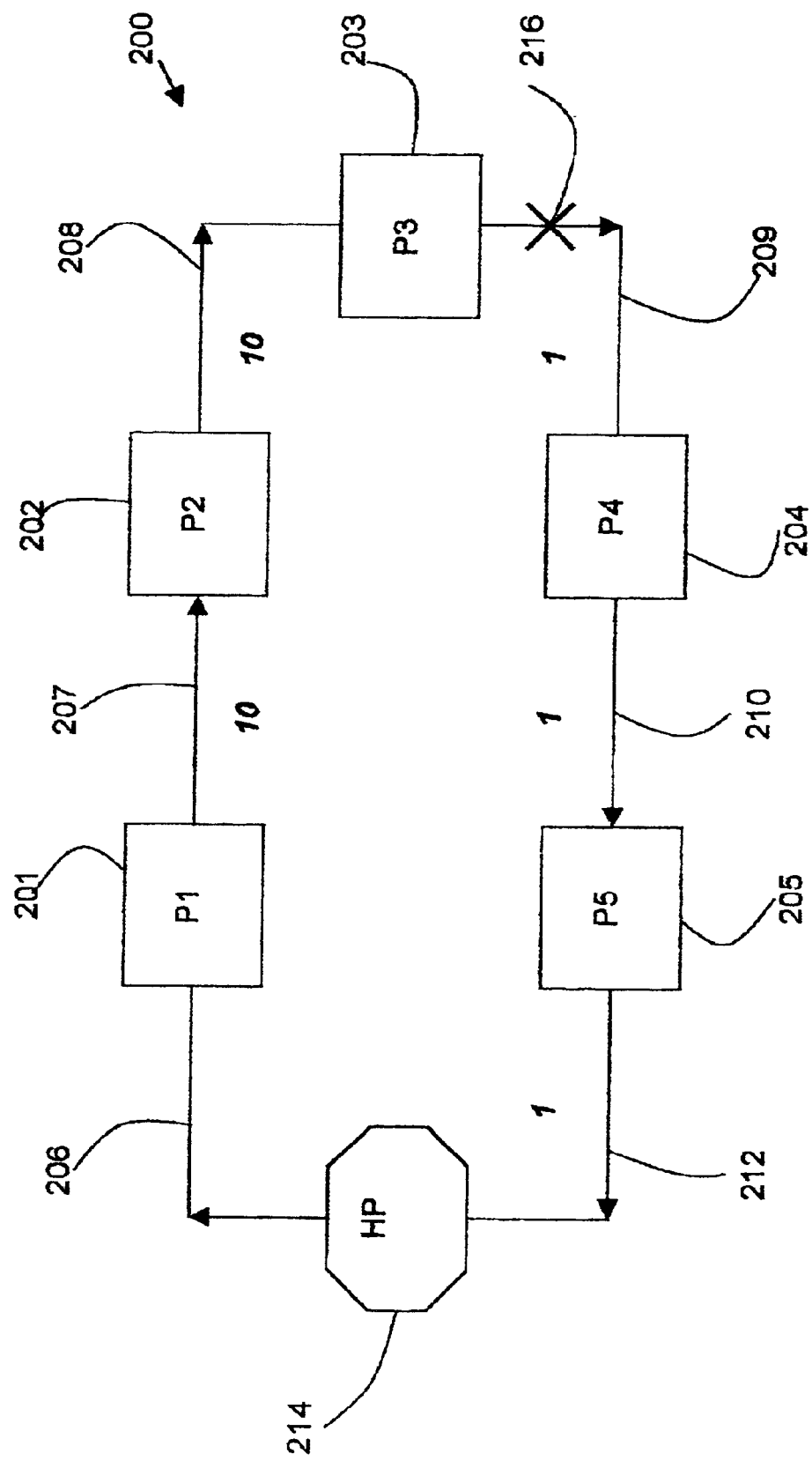
FIG. 5 is a block diagram showing data flow in the Fibre Channel Arbitrated Loop of FIG. 2a with an uneven distribution of reads to each port.

Referring to FIG. 5, a loop 200 is shown with a fault 216 in connection 209 between ports P3 203 and P4 204. 10 times as many reads from P1 201 and P2 202 are made compared to reads from P3 302, P4 304 and P5 305. The counters would therefore take the form shown in Table 5.

TABLE 5

| Port | Count | Totals |
|---|---|---|
| HP | 10 + 10 + 1 | 21 |
| P1 | | 0 |
| P2 | 10 | 10 |
| P3 | 10 + 10 | 20 |
| P4 | 10 + 10 + 1 | 21 |
| P5 | 10 + 10 + 1 | 21 |

It can be seen from Table 5 that the fault can be located as before as the point at which the total count stops increasing, i.e. between P3 and P4.

Table 6 shows the counts in the situation in which there are 10 times as many reads from Port P3 as opposed to Ports P1, P2, P4 and P5.

TABLE 6

| Port | Count | Totals |
|---|---|---|
| HP | 1 + 1 + 10 | 12 |
| P1 | | 0 |
| P2 | 1 | 1 |
| P3 | 1 + 1 | 2 |
| P4 | 1 + 1 + 10 | 12 |
| P5 | 1 + 1 + 10 | 12 |

The position of the fault can be determined as before as being between ports P3 and P4.

Table 7 shows the counts in a situation in which there are 10 times as many reads from ports P4 and P5 than ports P1, P2 and P3.

TABLE 7

| Port | Count | Totals |
|---|---|---|
| HP | 1 + 1 + 1 | 3 |
| P1 | | 0 |
| P2 | 1 | 1 |
| P3 | 1 + 1 | 2 |
| P4 | 1 + 1 + 1 | 3 |
| P5 | 1 + 1 + 1 | 3 |

Since ports P4 and P5 do not generate errors, this table is the same as Table 1 and again the fault can be located as being between ports P3 and P4.

Overall, the method for detecting the fault, when the fault occurs evenly, is independent of the proportioning of the data reads. However, it is important that the error occurs evenly. Similar analysis can be done for data writes to show the same outcome of the analysis.

The nature of FC-AL allows any port to be bypassed at any time thereby altering the physical topology of the loop. This may not be detected by the host port. This does not-matter as no reads or writes will occur for the now missing port and it will not contribute errors from read or writes.

The next described set of embodiments, addresses multiple errors. This involves a slightly different technique and has the following prerequisites: ability to determine how many frames were discarded by the data under run; and knowledge of the frame size used in the transfer.

Figure 6:
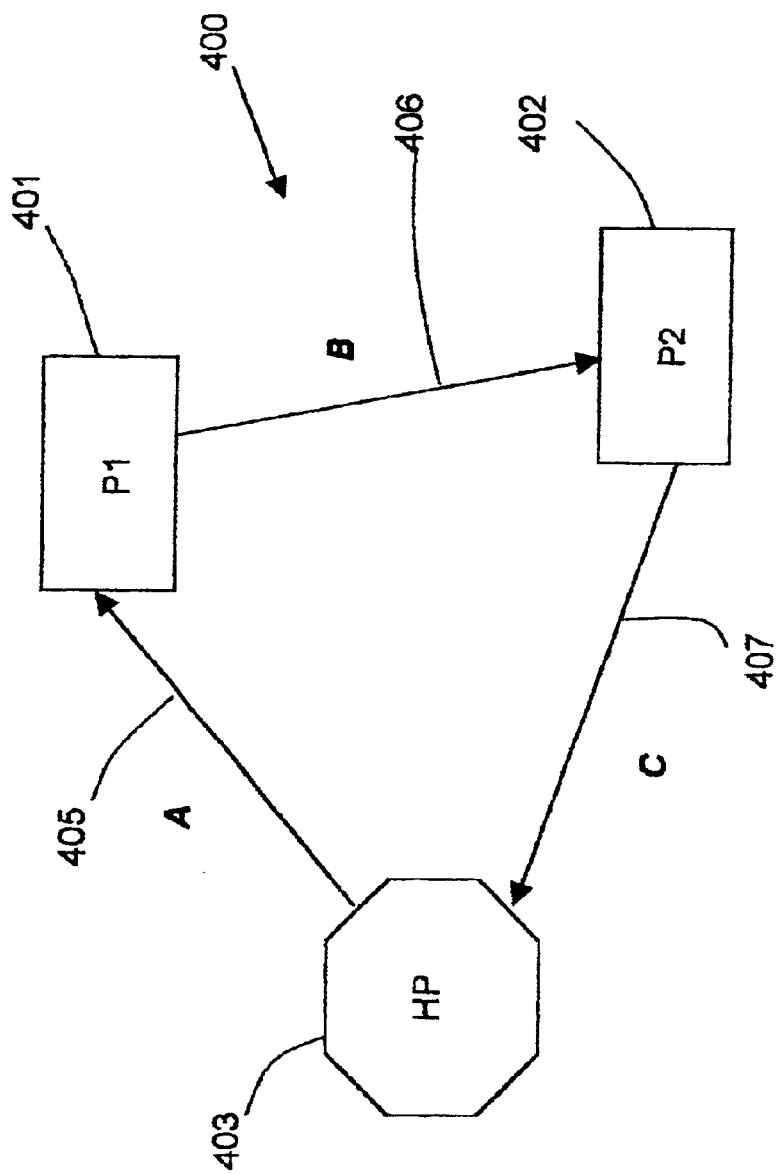
FIG. 6 is a block diagram showing a Fibre Channel Arbitrated Loop where each segment of the loop has a different error rate in accordance with the present invention.

FIG. 6 shows a small FC-AL loop 400 with a host port 403, a node port P1 401 and a node port P2 402. The loop 400 has a connection 405 between the host port 403 and P1 401, a connection 406 between P1 401 and P2 402 and a connection 407 between P2 402 and the host port 403. Data is transferred in the direction from the host port 403 to P1 401, to P2 402 and back to the host port 403.

Each segment of the FC-AL loop 400 has a different error rate. The percentage of frames corrupted by the connection 405 between the host port 403 and P1 401 is A, between ports P1 401 and P2 402 is B and between port P2 402 and the host port 403 is C. For example, if, on average, the connection 405 between the host port 403 and the P1 401 corrupted one frame out of twenty, that is 5% and therefore A=0.05.

Considering the data read case only. Assume that the host port 403 issues R1 reads to P1 and R2 reads to P2.

The host port reading from P1 has the following possibilities:

Error in connection 406 between P1 and P2 and error in connection 407 between P2 and the host port 403:

$$R1*(B*C)$$

Error in connection 406 between P1 and P2 but no error in connection 407 between P2 and the host port 403:

$$R1*(B*(1-C))$$

No error in connection 406 between P1 and P2 but an error in connection 407 between P2 and the host port 403:

$$R1*((1-B)*C)$$

If no error in connection 406 between P1 and P2 and no error in connection 407 between P2 and the host port 403: no error in read and therefore no data under run.

The number of frames of data under run for the host port 403 reading from P1 would therefore be:

$$R1*(B*C)+R1*(B*(1-C))+R1*((1-B)*C)=R1*(B+C-(B*C))$$

The host port 403 reading from P1→R1*(B+C−(B*C))
The host port 403 reading from P2→R2*C A table corresponding to the tables shown for the previous embodiments would be of the following form:

TABLE 8

| Port | Count |
|------|-------|
| HP   | 0     |
| P1   | R1 * (B + C − (B * C)) |
| P2   | R2 * C |

The algorithm results in a series of simultaneous equations which can be solved by starting with the port adjacent the host port as there is only one error rate. The solution can then be expanded around the loop. The above algorithm expands according to the number of ports.

To solve the above equations, the problem is trivial when both B and C are zero, as there are no errors.

If B is zero then this cannot be determined without knowing C, both counts at P2 and P1 will be non-zero indicating that this could be happening. Therefore C needs to be solved first. This cannot be done without knowing R2. Once R2 is known, C can be determined. Once C is known, B can be determined, and it may be zero.

The above is easiest to solve when both R1 and R2 are the same. The reasoning is that if B is zero and C is not, then the count of errors for P1 and P2 will be the same, indicating that B is in fact zero.

If R1 and R2 are not the same, then they will have to be counted, because if R1/R2 is the same as C/(B+C−(B*C)), then the counts for P1 and P2 will be the same and therefore B would appear to be zero. C has been determined as non-zero and therefore a single error has been detected. Once replaced, further analysis would note that B is non zero and therefore also in error. This is the single failure analysis case already described.

To be able to detect multiple errors, both R1 and R2 must be known. Knowing R2 allows C to be found. Once this has been done, B can be determined as zero or non-zero and therefore indicative of errors. Knowing R1 would allow B to be found, thereby detecting both errors in one analysis.

Needless to say, the whole of the above applies to writes as well. For example, if W1 is the number of writes from the host port 403 to P1 and W2 is the number of writes to P2, then the following equations will apply:
The host port 403 writing to P1 W1*A
The host port 403 writing to P2 W2*(A+B−(A*B))

This algorithm can therefore be used to find multiple errors in an FC-AL causing data under runs during read and write data transfers.

The statistical analysis of counts as described herein is carried out in the form of an algorithm with programs running in the host port.

In order to be able to implement error determination on the host port, an example follows for the case where one error is being determined in each data transfer direction.

The host port sets up a table of counts after the physical order of the ports has been determined, for example by completing a Loop Initialisation Procedure for each port identified in the LILP. The counts are initially zeroed. The host port need take no action when a data transfer completes with no data under run. In a read case, if a transfer completes with a data under run, the host must increment the count from the port after the port being read, up to and including the host port itself. In a write case, if a transfer completes with a data under run, the host must increment the counts from after the host port and up to and including the port being written to.

The host may also find it convenient to increment a counter for each data under run that occurs, one for reads and one for writes, to count the number of reads and writes. The reason for this is that the more data transfers there are, the more accurate is the algorithm.

If only one data under run occurs, then the results are somewhat biased, because one port would immediately be identified as being in error, and this may not be the case. If this incorrectly modified port was bypassed, then further errors would occur, and further bypasses would be made until the real faulty port was bypassed. At this point it could be surmised that all the previously bypassed ports were not at fault and they could be un-bypassed. This would be a satisfactory way to find the faulty port, and during an error recovery procedure this would be acceptable. If, however, normal I/O operations were ongoing then, this may provide a problem as useful ports would be bypassed.

If there is a count of data under run errors, the algorithm could be applied once the number of counts has reached a certain threshold. Alternatively, if it is acceptable to the environment, it would be possible to instigate a procedure that solely targets the devices in question, so that errors were detected more quickly and the algorithm detected faulty device could just be bypassed.

In the case where multiple errors are being detected the host port must have the ability to count the number of reads and writes to each port, and as the host port will be responsible for initiating the reads and writes this should not be a difficult issue to resolve. For FC-AL implementations, it makes most sense to determine the number of frames sent to or being read from the port, as a whole frame is the basic quantum of error. This would then be R1 or R2 accordingly. Again, after a period of time, there will be enough data to make a determination of C. Which in turn would lead to a determination of B and so on.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

What is claimed is:

1. A method for fault location in a loop network including a plurality of ports, the method comprising:
   identifying a data transfer between two ports in which the data received at a destination port is less than the expected amount of data;
   incrementing a count for each port after a sending port for the data transfer up to and including the destination port for each identified data transfer, so that the data transfers to each port are counted; and
   analysing the counts to determine a fault location, wherein said analysing includes solving simultaneous equations for each port to determine the error rates for each port.

2. A method as claimed in claim 1, wherein the step of analysing the counts includes obtaining details of the topology of the loop network.

3. A method as claimed in claim 1, wherein the step of analysing the counts includes ordering the counts in an order according to the number of ports traversed in the loop network.

4. A method as claimed in claim 3, wherein the data transfers are read transfers and the step of analysing the counts identifies a port location in the ordered counts at which the total counts for each port stop incrementing.

5. A method as claimed in claim 3, wherein the data transfers are write transfers and the step of analysing the counts identifies a port location in the ordered counts at which the total counts for each port drops.

6. A method as claimed in claim 1, wherein the method includes sending and receiving data from a host port to a plurality of successively connected ports.

7. A method as claimed in claim 1, wherein two fault locations are determined in a single analysis by analysing both read and write flows.

8. A method as claimed in claim 1, wherein the loop network is a Fibre Channel Arbitrated Loop.

9. A loop network system comprising:
   a host port for supplying and receiving data;
   a plurality of successively connected ports through which data from the host port is transferred;
   a counter for each port, for counting data transfers to each port and for recording data transfers in which the amount of data received at a destination port is less than an expected amount of data,
   wherein, when a data transfer in which the amount of data transferred is less than an expected amount of data is identified for a data transfer between a sending port and a destination port, the counters are incremented for each port after the sending port up to and including the destination port; and
   analysing means for solving simultaneous equations for each port to determine the error rates for each port and for determining a fault location in the network system from the distribution of counts in the counters.

10. A loop network system as claimed in claim 9, wherein the analysing means includes means for obtaining details of the topology of the network.

11. A loop network system as claimed in claim 9, wherein the analysing means includes means for ordering the counts for the ports in an order according to the number of ports traversed in the loop network system.

12. A loop network system as claimed in claim 11, wherein the data transfers are read transfers and the analysing means identifies a port location at which the total counts for each port stop incrementing.

13. A loop network system as claimed in claim 11, wherein the data transfers are write transfers and the analysing means identifies a port location at which the total counts for each port drops.

14. A loop network system as claimed in claim 9, wherein the loop network system is a Fibre Channel Arbitrated Loop.

15. A computer program product for fault location in a loop network including a plurality of ports, the computer program product stored on a computer readable storage medium, comprising computer readable program code means for performing the steps of:
   identifying a data transfer between two ports in which the data received at a destination port is less than the expected amount of data;
   incrementing a count for each port after a sending port for the data transfer up to and including the destination port for each identified data transfer, so that the data transfers to each port are counted; and
   analysing the counts to determine a fault location, wherein said analysing includes solving simultaneous equations for each port to determine the error rates for each port.

* * * * *